United States Patent Office 3,076,512
Patented Feb. 5, 1963

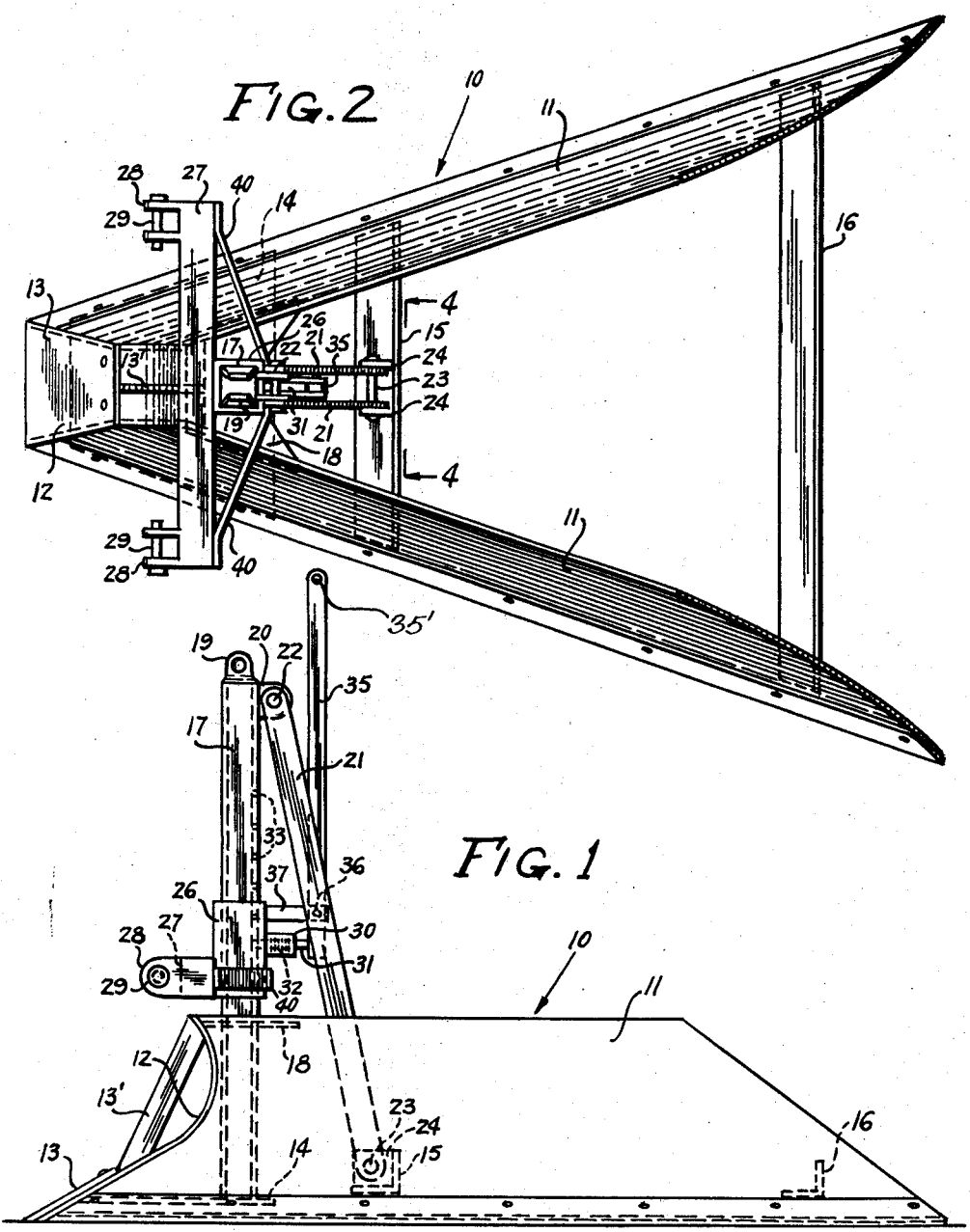

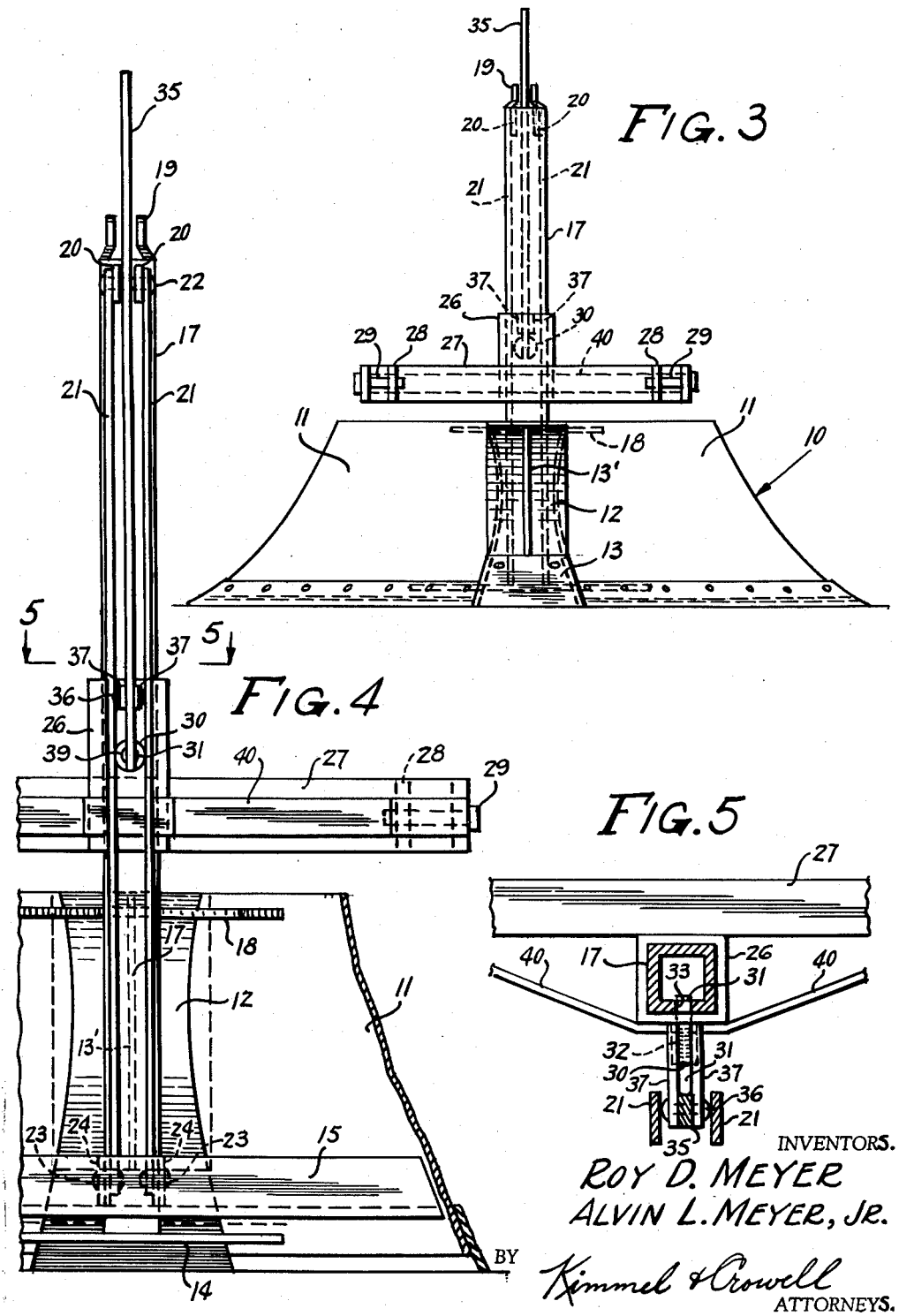

3,076,512
THREE-POINT HITCH
Alvin L. Meyer, Jr., and Roy Dee Meyer, Fairfield, Mont.
Filed Dec. 14, 1961, Ser. No. 159,408
3 Claims. (Cl. 172—448)

This invention relates to a three-point hitch and has particular adaptability to a three-point hitch for a ditching V or the like, adapted to be attached to a tractor or similar towing vehicle. A primary object of the invention is the provision of a three-point hitch which is vertically adjustable to increase the limits of such a hitch system, by providing various starting points, either higher or lower according to the position of an attached implement or machine in a given situation.

An additional object of the invention is the provision of a vertically adjustable hitch adaptable to any three-point hitch equipment, but particularly useful in connection with the ditching V shown in Patent No. 3,003,263 issued to applicants, dated October 10, 1961.

A more specific object of the invention is the provision of a three-point hitch of this character which is controlled by a retractable spring loaded lever operated pin which engages in adjustment holes in a vertical supporting beam.

A further object of the invention is the provision of a device of this character which is extremely rugged, sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter and disclosed in the accompanying drawings wherein:

FIGURE 1 is a side elevational view of the three-point hitch of the instant invention shown as applied to a ditching point.

FIGURE 2 is a top plan view of the structure of FIG. 1, parts thereof being shown in section.

FIGURE 3 is an end elevational view of the device of FIGS. 1 and 2 as shown from the left.

FIGURE 4 is an enlarged sectional view taken substantially along the line 4—4 of FIG. 2 as viewed in the direction indicated by the arrows; and FIGURE 5 is a fragmentary enlarged sectional view taken substantially along the line 5—5 of FIG. 4 as viewed in the direction indicated by the arrows.

Similar reference characters refer to similar parts throughout the several views of the drawing.

Having reference now to the drawings in detail, there is generally indicated at 10 a ditcher point, such as fully shown in our above-mentioned Patent No. 3,003,263, and which is merely representative of the various types of apparatus with which the hitch of the instant invention may be employed. The ditcher point 10 is comprised of a pair of diverging mold boards 11 which converge to a plow point 12 which is inwardly and rearwardly concaved, and which is provided with a replaceable cutting edge or spade 13. A substantially triangular supporting plate 14 is provided beneath the forward portion of a ditching V and a transverse angle iron 15 is provided at an intermediate point adjacent the plate 14. A rear transverse reinforcing angle iron 16 completes the basic plow point assembly, which comprises no part of the instant invention per se.

The hitch of the instant invention is comprised of a vertical upright 17, of hollow rectangular construction, which is fixedly secured at its base to the plate 14, and further secured to an additional transverse plate 18 which extends across the top of the mold boards adjacent the ditching blade.

A clevis 19 surmounts the top of post 17, and comprises one point of the three-point hitch.

A pair of lugs 20 extend toward the divergent ends of the mold boards 11 and are secured to the top of the upright 17. A pair of lift bars 21 are pivotally secured by means of a pivot pin 22 to the lugs 20 at their upper extremities, and at their lower extremities are secured pivotally as by means of a pivot 23 to upstanding lugs 24 carried by angle bar 15.

A vertically movable, generally rectangular slide box 26 surrounds upright 17, and carries a transversely extending bar 27 which is provided with a clevis 28 at each end thereof, each clevis in turn being provided with a pin 29, which form the other two points of the three-point hitch of the instant invention. Sleeve 26 is provided with a rearwardly extending lug 30 which is bored to receive a pin 31, which is spring biased as by means of a spring 32 into a selected one of a plurality of vertical openings 33 in the rear of upright member 17, and hence maintained in a selected position of adjustment thereon. The relative position of the sleeve 26 and its associated clevises 28 controls the angle of inclination of the ditching point 10 and its relative height. Pin 31 may be retracted from a selected opening by means of a lever 35 which is pivotally secured as by means of a pin 36 to a clevis 37 above and adjacent the end of the pin, and which is suitably connected as by a pivot 39, to the end of pin 31. The upper end of lever 35 contains an opening 35' which is adapted to receive a control arm or cable (not shown) extending from the body of a tractor or other towing vehicle so that the pin 31 may be released from a remote point to permit relative raising or lowering of the sleeve 26 and its associated clevises.

Inclined horizontal reinforcing braces 40 are secured to the ends of transverse member 27 and extend inwardly and are secured as by welding or the like to the rear of slide box 26 to provide reinforcement for the transverse bar 27 and its associated clevises 28 and 29.

From the foregoing the use and operation of the device should now be readily understandable. Operation of the lever 35 releases the spring loaded pin 31 from its associated opening 33 which permits the ditcher point 10 to be tilted by means of the connecting braces 21 and raised or lowered on the upright 17 in accordance with the position of the sleeve 26. Such raising or lowering varies the relative distance between the hitch pins 29 and the upper connection through the clevis 19, and accordingly permits a wide variation of adjustability in the relative height and positioning of the ditcher V point or any other mechanism associated with the three-point hitch of the instant invention.

From the foregoing it will now be seen that there is herein provided an improved three-point hitch which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is merely illustrative, and not in a limiting sense.

We claim:
1. An adjustable three-point hitch for tractor towed implements, comprising a vertical upright mounted on a forward portion of said implement, a clevis forming one point of said hitch at the top of said upright, an adjustment link pivoted at one end to a point adjacent the top of said upright and at its other end pivoted to said implement at a point rearwardly of the mounting of said upright, a sleeve slidably mounted on said upright, a transverse bar secured to said sleeve, a clevis at each end of said bar forming the other two points of said three-point hitch, and means selectively securing said sleeve at various points on said vertical upright, said last-mentioned means comprising a spring loaded pin selectively engageable in one of a plurality of vertically aligned openings in said upright.

2. An adjustable three-point hitch for tractor towed implements, comprising a vertical upright mounted on a forward portion of said implement, a clevis forming one point of said hitch at the top of said upright, an adjustment link pivoted at one end to a point adjacent the top of said upright and at its other end pivoted to said implement at a point rearwardly of the mounting of said upright, a sleeve slidably mounted on said upright, a transverse bar secured to said sleeve, a clevis at each end of said bar forming the other two points of said three-point hitch, means selectively securing said sleeve at various points on said vertical upright, said last-mentioned means comprising a spring loaded pin selectively engageable in one of a plurality of vertically aligned openings in said upright,
a lever pivoted to said pin and said upright and a remote control means for moving said lever.

3. An adjustable three-point hitch for tractor towed implements, comprising a vertical upright mounted on a forward portion of said implement, a clevis forming one point of said hitch at the top of said upright, an adjustment link pivoted at one end to a point adjacent the top of said upright and at its other end pivoted to said implement at a point rearwardly of the mounting of said upright, a sleeve slidably mounted on said upright, a transverse bar secured to said sleeve, a clevis at each end of said bar forming the other two points of said three-point hitch, means selectively securing said sleeve at various points on said vertical upright, said last-mentioned means comprising a spring loaded pin selectively engageable in one of a plurality of vertically aligned openings in said upright, a lever pivoted to said pin and said upright, a remote control means for moving said lever,
and diagonal reinforcing bars extending from the ends of said transverse bar to said sleeve and secured thereto.

References Cited in the file of this patent

UNITED STATES PATENTS

| | | |
|---|---|---|
| 1,864,639 | Crezee | June 28, 1932 |
| 2,453,723 | Palmer | Nov. 16, 1948 |
| 2,527,613 | Zagurski | Oct. 31, 1950 |
| 2,755,571 | Clark | July 24, 1956 |
| 2,840,935 | Bird | July 1, 1958 |
| 2,916,835 | Boyce | Dec. 15, 1959 |
| 3,041,751 | Chattin | July 3, 1962 |

FOREIGN PATENTS

| | | |
|---|---|---|
| 854,758 | Great Britain | Nov. 23, 1960 |